(12) United States Patent
Feder et al.

(10) Patent No.: US 7,839,815 B2
(45) Date of Patent: Nov. 23, 2010

(54) TRIGGERING MIGRATION OF A NETWORK ACCESS AGENT ASSOCIATED WITH AN ACCESS TERMINAL

(75) Inventors: Peretz Feder, Engelwood, NJ (US); Sureshbabu P. Nair, Whippany, NJ (US); Ajay Rajkumar, Morristown, NJ (US); Michael Turner, Madison, NJ (US); Lily H. Zhu, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1022 days.

(21) Appl. No.: 11/351,805

(22) Filed: Feb. 10, 2006

(65) Prior Publication Data

US 2007/0189201 A1    Aug. 16, 2007

(51) Int. Cl.
*H04W 4/00* (2009.01)

(52) U.S. Cl. .......... 370/328; 370/311; 370/318; 370/330; 370/348; 455/333

(58) Field of Classification Search .......... 370/311, 370/318, 328, 330, 348; 455/333
See application file for complete search history.

(56) References Cited

U.S. PATENT DOCUMENTS

| | | | |
|---|---|---|---|
| 5,889,770 A * | 3/1999 | Jokiaho et al. | 370/337 |
| 6,539,227 B1 * | 3/2003 | Jetzek et al. | 455/442 |
| 7,142,520 B1 * | 11/2006 | Haverinen et al. | 370/311 |
| 7,203,527 B2 * | 4/2007 | Czaja et al. | 455/574 |
| 2001/0036834 A1 * | 11/2001 | Das et al. | 455/458 |
| 2003/0073449 A1 * | 4/2003 | Motegi et al. | 455/458 |
| 2003/0148779 A1 * | 8/2003 | Aravamudan et al. | 455/519 |
| 2005/0148362 A1 * | 7/2005 | Jagadeesan et al. | 455/555 |
| 2006/0099973 A1 * | 5/2006 | Nair et al. | 455/461 |
| 2007/0066329 A1 * | 3/2007 | Laroia et al. | 455/502 |

FOREIGN PATENT DOCUMENTS

WO    WO 01/97549 A1    5/2001

OTHER PUBLICATIONS

International Search Report and Written Opinion mailed Jul. 27, 2007.
XP001131425—R. Ramjee et al; *IP Paging Service for Mobile Hosts*; Wireless Networks, ACM, NY, vol. 8, No. 5, Sep. 5, 2002 pp. 427-441.
XP-010825512—Liebsch M. et al; "*Utilization of the IEEE802.11 Power Save Mode with IP Paging*"; Communications, 2005, ICC 2005, 2005 IEEE International Conference on Seoul, Korea (May 16-20, 2005) pp. 1383-1389.

* cited by examiner

*Primary Examiner*—Rafael Pérez-Gutiérrez
*Assistant Examiner*—Liton Miah
(74) *Attorney, Agent, or Firm*—Williams, Morgan & Amerson

(57) ABSTRACT

A method is provided for triggering migration of call session state information. The method includes determining whether to migrate a network access agent associated with an access terminal in a wireless communication system based on at least one of mobility information associated with the access terminal and status information associated with the wireless communication system.

17 Claims, 6 Drawing Sheets

TRIGGERING MIGRATION OF A NETWORK ACCESS AGENT ASSOCIATED WITH AN ACCESS TERMINAL

BACKGROUND OF THE INVENTION

1. Field of the Invention

This invention relates generally to a communication system, and, more particularly, to a wireless communication system.

2. Description of the Related Art

In conventional wireless telecommunications, one or more access terminals may establish a wireless link to a Radio Access Network (RAN). The RAN architecture is typically hierarchical and call state information associated with each access terminal call session is stored in a central repository, such as a Radio Network Controller (RNC), a Packet Data Serving Node (PDSN), and the like. One alternative to the conventional hierarchical network architecture is a distributed architecture including a network of base station routers. For example, each base station router may combine RNC and/or PDSN functions in a single entity that manages radio links between one or more access terminals and an outside network, such as the Internet. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the RNC and PDSN of hierarchical networks may be reduced or removed.

In a distributed architecture, the base station router incorporates the RNC and PDSN functionality. One or more network access agents associated with access terminals in the service area of the base station router may implement Mobile IP (MIP). The network access agents are typically a part of the PDSN protocol suite and are responsible for providing connectivity between the access terminal and the distributed network. For example, the network access agent may be a foreign agent that provides Point of Attachment (PoA) and/or Care of Address (CoA) functionality for the access terminal. The access terminal also registers with a home agent (HA) that provides a permanent/semi-permanent attachment to an Internet Protocol (IP) network and maintains information that identifies the foreign agent that is serving the access terminal. Accordingly, information transmitted by the access terminal may travel over an air interface to the base station router and then be directed to the IP network via the home agent. Information intended for the access terminal may travel from the IP network to the base station router via the home agent and then to the access terminal over the air interface.

The base station router that provides the air interface to the access terminal may change if the access terminal moves through the wireless network. For example, if an access terminal having an active call session moves from a geographic area served by a first base station router to a different geographic area that is served by a second base station router, then the network access agent associated with the access terminal may be migrated or transferred from the first base station router to the second base station router, and the second base station router then becomes the serving base station router. The home agent typically remains the same as the access terminal roams throughout the network. If the access terminal moves frequently, then the additional overhead associated with repeatedly transferring the network access agent may undesirably consume scarce network resources.

When an access terminal becomes idle or dormant, the air interface with the serving base station router and any data paths in the radio access network are torn down to conserve scarce network resources. Migrating the network access agent associated with a roaming idle access terminal also consumes scarce network resources. For example, a foreign agent may relay traffic between the home agent and the access terminal according to Mobile IP techniques, in which case the foreign agent may be referred to as a layer 3 anchor. Transferring a layer 3 anchor from one base station router to another base station router requires forming a new radio connection to the access terminal, which adds signaling overhead and brings the access terminal back to the active mode. If the idle access terminal moves frequently, then the additional overhead associated with repeatedly transferring the layer 3 anchor may consume scarce network resources, potentially defeating the purpose of placing the access terminal in the idle mode. Consequently, conventional distributed networks do not typically migrate foreign agents associated with idle access terminals until the access terminal is activated in response to incoming or outgoing communications.

However, failing to migrate the foreign agent associated with idle access terminals may also have a number of drawbacks. Depending on the circumstances, the idle access terminal may roam to a geographic area associated with a base station router that is distant from the previous serving base station router. Thus, when the access terminal wakes up and attempts to resume the idle or dormant call session, the foreign agent may need to be migrated to the new base station router. For example, the access terminal may need to re-register with the network and may need to perform a foreign agent relocation to the new base station router before an active communication link can be established with the base station router. The foreign agent relocation procedure may increase the session reactivation delay for the access terminal. The session reactivation delay may be particularly troublesome if the call session associated with the access terminal is designed to respond rapidly to incoming and/or outgoing information. For example, Push-to-Talk applications are designed to respond substantially immediately to incoming and/or outgoing information and so may not operate in the desired manner when the session reactivation delay is significant.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for triggering migration of a network access agent. The method includes determining whether to migrate a network access agent associated with an access terminal in a wireless communication system based on at least one of mobility information associated with the access terminal and status information associated with the wireless communication system.

BRIEF DESCRIPTION OF THE DRAWINGS

The invention may be understood by reference to the following description taken in conjunction with the accompanying drawings, in which like reference numerals identify like elements, and in which.

Figure 1:
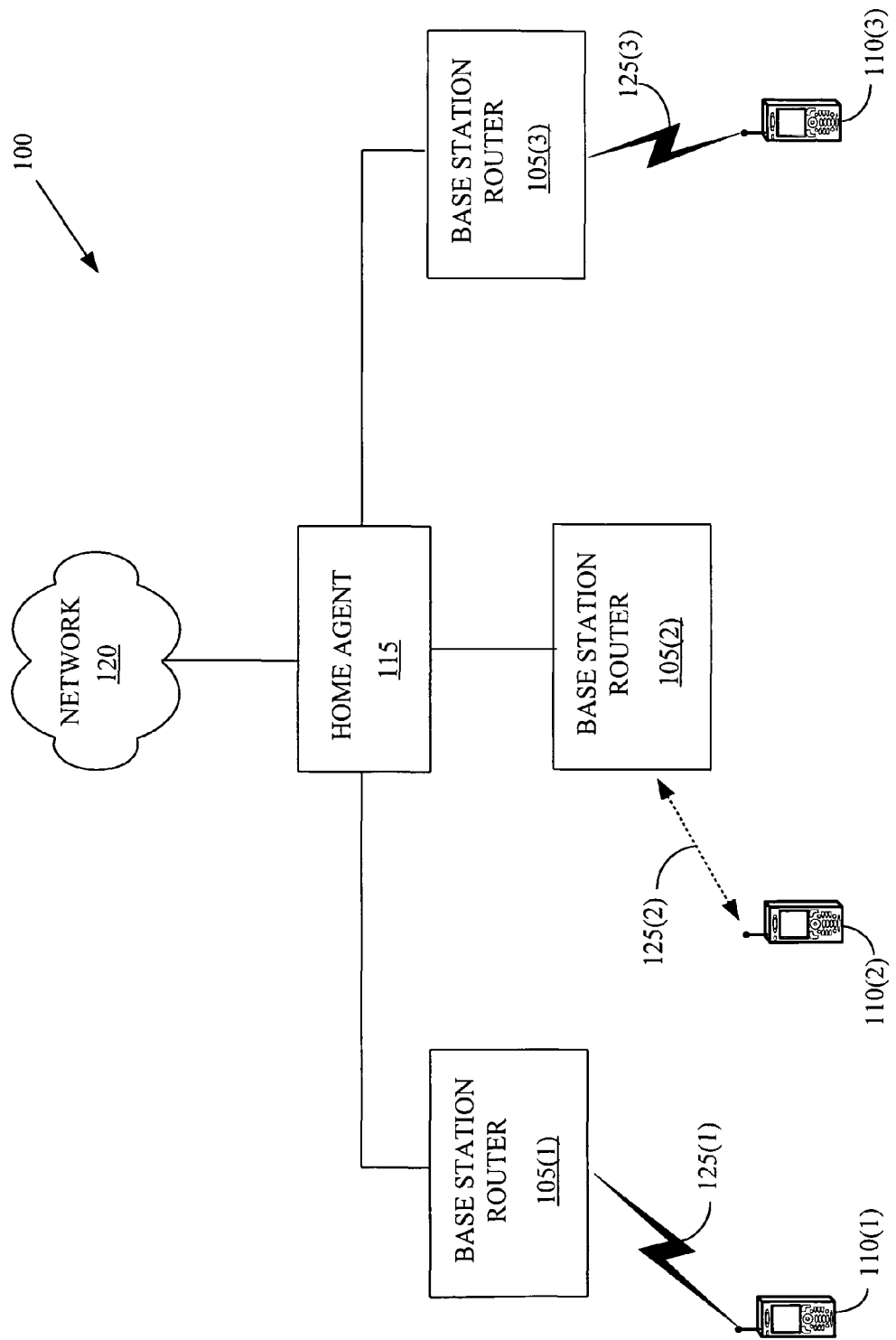
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a distributed wireless communication system 100. In the illustrated embodiment, the distributed wireless communication system 100 may operate according to one or more wireless communication standards and/or protocols. For example, the distributed wireless communication system 100 may implement one or more of a Universal Mobile Telecommunication System (UMTS), a Code Division Multiple Access (CDMA, CDMA 2000) protocol, 3G1X data services, Evolution Data-Optimized (1X EV-DO) services, High Speed Data Packet Access (HSDPA), a WiMAX system, and the like. In the illustrated embodiment, the distributed wireless communication system 100 implements a Mobile Internet Protocol (MIP) to manage layer 3 mobility. However, persons of ordinary skill in the art should appreciate that the present invention is not limited to these exemplary wireless communication standards and/or protocols. In alternative embodiments, portions of the wireless communication system 100 may implement in a wired and/or wireless standard and/or protocol.

In the illustrated embodiment, access points for the distributed wireless telecommunication system 100 include a distributed network of base station routers 105(1-3). Hereinafter, in the interest of clarity, the base station routers 105(1-3) will be referred to collectively by the index 105 unless the description is referring to a specific base station router 105, such as the base station router 105(1). Although the present invention will be described in the context of the distributed wireless telecommunication system 100 comprising a plurality of base station routers 105, persons of ordinary skill in the art should appreciate that the present invention is not limited to distributed wireless telecommunication systems 100 in which the access points are base station routers 105. In alternative embodiments, the distributed wireless telecommunication system 100 may include any desirable number and/or type of access point.

In the illustrated embodiment, the base station routers 105 are communicatively coupled to a home agent 115, which may act as the permanent and/or semi-permanent attachment to an IP network 120. The home agent 115 may implement one or more versions of MIP. The base station routers 105 may also be configured to communicate with other base station routers 105, other home agents 115, other devices, other networks 120, and the like in a manner known to persons of ordinary skill in the art. Techniques for configuring and/or operating base station routers 105 and/or home agents 115 are known to persons of ordinary skill in the art and, in the interest of clarity, only those aspects of the configuration and/or operation of base station routers 105 and/or home agents 115 that are relevant to the present invention will be discussed further herein.

Figure 2:
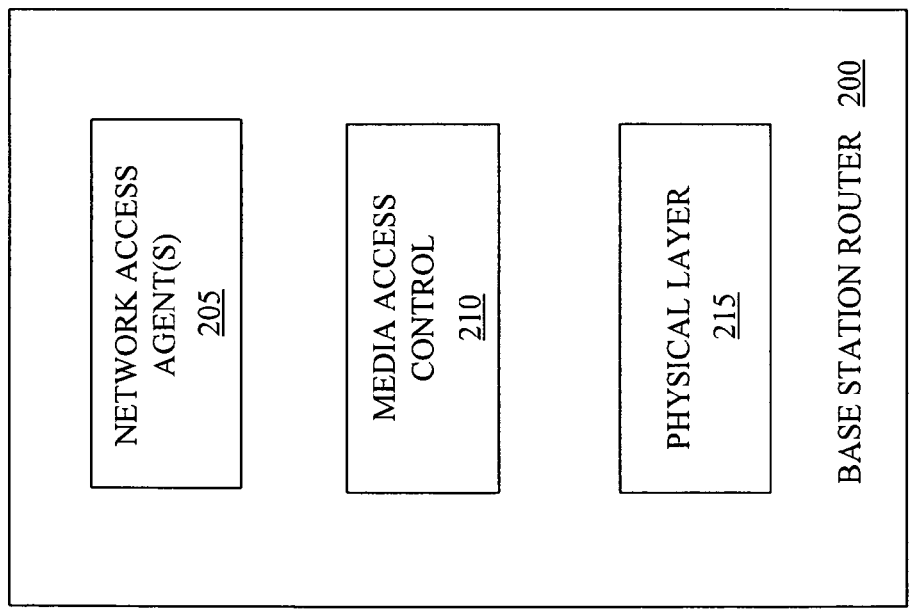
FIG. 2 conceptually illustrates one exemplary embodiment of a base station router, in accordance with the present invention.

FIG. 2 conceptually illustrates one exemplary embodiment of a base station router 200. In the illustrated embodiment, the base station router 200 includes one or more network access agents 205. As used herein, the term "network access agent" will be used to refer to the entity within the base station router 200 that is used to provide point-of-attachment and/or care-of-address functionality for an access terminal. Thus, the base station router 200 may include one or more network access agents 205 that may be responsible managing connectivity between one or more access terminals and the home agent(s) associated with the access terminals. For example, a network access agent may be responsible for translating a local Internet address (or network address identifier) associated with an access terminal to the appropriate global Internet address assigned to the access terminal by its home agent. The network access agents 205 may be implemented at the application layer (or layer 3). Examples of network access agents include the foreign agent defined by MIP version 4 and the access router defined by MIP version 6.

The network access agents 205 in the base station router 200 may be associated with access terminals that currently have an active or inactive communication link with the base station router 200. Furthermore, in some cases, the base station router 200 may include network access agents 205 associated with access terminals that have had an active or inactive communication link with the base station router 200, but have since moved and established an active or inactive communication link with a different base station router.

The base station router 200 may include a media access control layer 210 (e.g., one or more layer 2 entities) that handles access to shared media such as air interfaces associated with the base station router 200. The base station router 200 may also include a physical layer 215 (e.g., one or more layer 1 entities) that provides radio transmission and/or reception capabilities. In one embodiment, the media access control layer 210 and/or the physical layer 215 may operate in accordance with information stored by the network access agent 205. Persons of ordinary skill in the art having benefit of the present disclosure should appreciate that the network access agent 205, the media access control layer 210, and/or the physical layer 215 may be implemented in hardware, firmware, software, or any combination thereof.

Referring back to FIG. 1, the base station routers 105 provide wireless communication links 125 to access terminals 110 within an associated geographic region or cell. As used herein, the term "communication link" refers to the association between an access terminal and a base station router and may therefore include a radio interface, a session context of the access terminal, and the like. The access terminals 110 may also be referred to using terms such as "mobile unit," "mobile terminal," and the like. Each of the base station routers 105 may be capable of initiating, establishing, maintaining, transmitting, receiving, terminating, or performing any other desired action related to a call session with one or more access terminals 110. For example, each base station router 105 may combine Radio Network Controller (RNC) and Packet Data Serving Node (PDSN) functions in a single entity.

The access terminals 110 may be in either an active mode or in inactive mode. In the illustrated embodiment, the communication links 125(1) and 125(3) are active links and so the base station routers 105(1) and 105(3) are providing traffic channels and associated data paths to the respective active access terminals 110(1) and 110(2). The access terminal 110(2) is inactive in the illustrated embodiment. For example, the access terminal 110(2) may be in an idle, sleep, or dormant mode. Embodiments of the active, idle, and sleep modes are defined by the IEEE 802.16 standard and/or the WiMAX standard. Dormant modes may be defined by the CDMA 1x standards. A sleeping access terminal is not currently transmitting or receiving information but otherwise maintains an active communication link with one or more base station routers. An idle or dormant access terminal has no radio interface with a base station router, but a valid session context associated with the access terminal is maintained in the base station router for the communication flows that were opened and have not yet been closed.

Accordingly, the access terminal 110(2) may still have a communication link 125(2) with the base station router 105(2). For example, when the access terminal 110(2) enters the idle mode, the existing traffic channel between the access terminal 110(2) and the base station router 105(2) has been torn down but the session context is maintained, as indicated by the dashed line 125(2). In various alternative embodiments, entry into the idle mode may be triggered by a user powering down the access terminal 110(2), silence in a voice communication, the absence of data requiring transmission, and the like. For example, the access terminal 110(2) may include a timer that starts when no voice or data is being transmitted or received. If the timer expires, the access terminal 110(2) becomes idle and the traffic channel may be torn down.

One or more of the mobile units 110 may move throughout the geographic area served by the base station routers 105. For example, one or more of the mobile units 110 may be roaming while in an active mode and one of more of the mobile units 110 may be roaming while in an inactive mode. Furthermore, one or more of the mobile units 110 may enter an inactive mode while roaming. Accordingly, network access agents associated with the roaming mobile units 110 may be migrated between the base station routers 105 while in inactive mode, prior to becoming inactive, during an inactive mode, and/or while exiting the inactive mode, as will be discussed in detail below.

The distributed wireless communication system 100 may determine whether to migrate network access agents associated with the access terminal(s) 110 based on mobility information associated with one or more of the access terminals 110. In various alternative embodiments, the mobility information may include information indicative of an activity mode (e.g., an active or inactive mode) associated with the access terminal 110, a transport delay associated with the relaying information from one base station router 105 to another, control signaling overhead (e.g., the overhead for control signaling used for a handoff of a roaming access terminal 110), a call reactivation time, a location of an access terminal 110, a location of a network access agent for an access terminal 110, a frequency or rate of mobility of physical layer mobility access, a policy based timer, and the like, as well as any combination thereof.

In one embodiment, the mobility information may include information associated with one or more applications running on one or more of the access terminals 110. As used herein, the term "application" will be understood to refer to programs, processes, and/or threads running on the access terminals 110 and/or the base station routers 105. Applications may also be referred to as layer 3 entities and may be used to provide voice services to users of the access terminals 110. Exemplary applications include, but are not limited to, Voice over Internet Protocol (VoIP), video and/or audio streaming, Push-to-Talk, and the like. Applications may be implemented in hardware, firmware, software, or any combination thereof. In various alternative embodiments, the mobility information associated with one or more applications may include information indicative of delay tolerances, quality of service (QoS) requirements associated with the user and/or the application, a grade of service associated with the user and/or the application, and the like.

The distributed wireless communication system 100 may also determine whether to migrate network access agents associated with the access terminal(s) 110 based on status information associated with the wireless communication system 100. The status information may include any information indicative of the current operating status of the wireless communication system 100 and/or the future operating status of the wireless communication system 100. Examples of status information associated with the wireless communication system 100 may include, but are not limited to, information indicative of a measured or projected network load, a planned or unplanned outage, scheduled maintenance, and the like. In one embodiment, the distributed wireless communication system 100 (or a base station router 105) may force migration of a network access agent, e.g., to manage resources or for maintenance of the current base station router 105. This process may be referred to as base station reselection or cell reselection. Persons of ordinary skill in the art having benefit of the present disclosure should appreciate that the mobility information and the status information may be used independently or in conjunction with each other.

Figure 3:
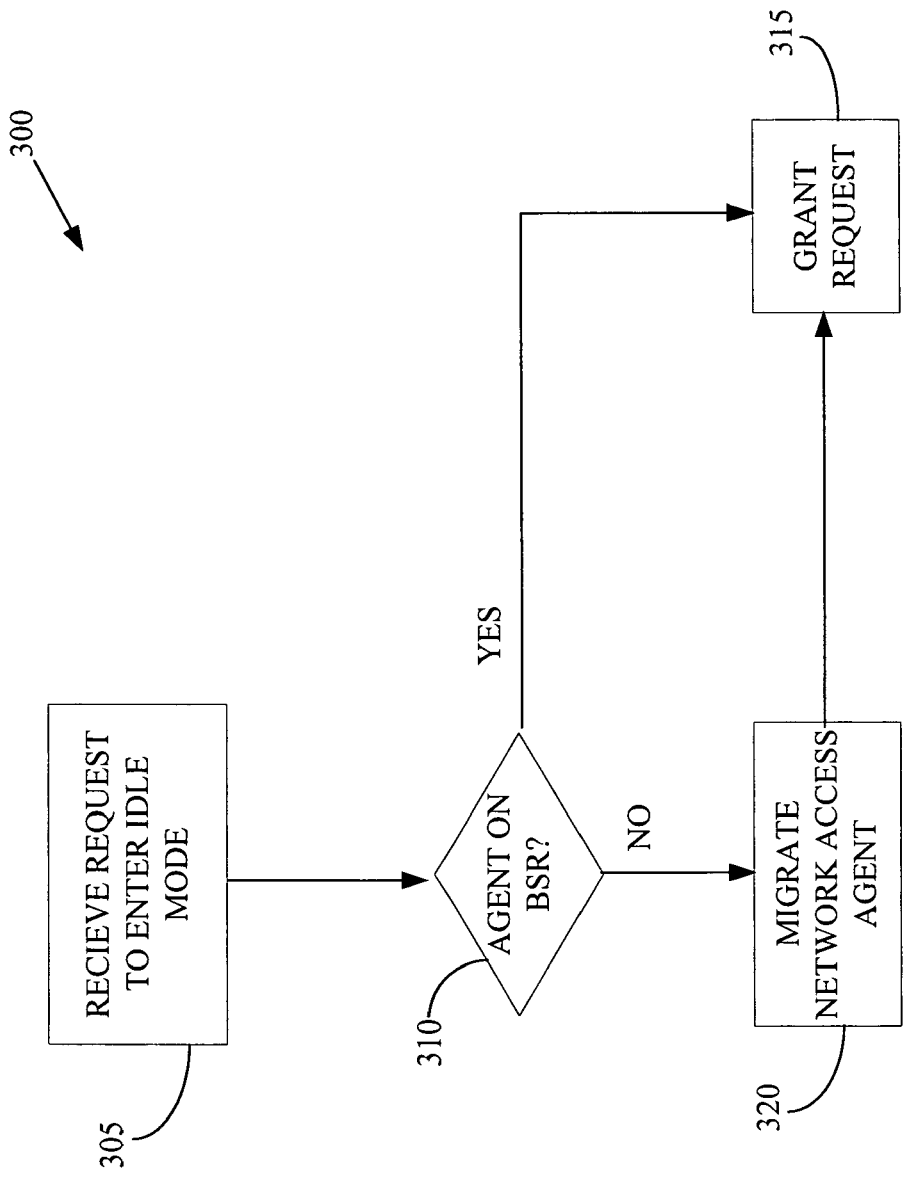
FIG. 3 conceptually illustrates one exemplary embodiment of a method for determining whether to migrate a network access agent prior to entering the idle mode, in accordance with the present invention.

FIG. 3 conceptually illustrates one exemplary embodiment of a method 300 for determining whether to migrate a network access agent prior to entering the idle mode. In the illustrated embodiment, a base station router may receive (at 305) a request from an access terminal to enter the idle mode. For example, the access terminal may determine that it has no pending transmissions and/or receptions and may therefore transmit the request to enter the idle mode to conserve battery power. For another example, the network may determine that it has no pending transmissions and/or receptions for the access terminal and may therefore transmit the request to enter the idle mode to conserve battery power. The base station router may then determine (at 310) whether or not the network access agent is on the serving base station router. The base station router may grant (at 315) the request and the access terminal may enter the idle mode if the network access agent is on the base station router, i.e. the base station router is the serving base station router.

If the network access agent associated with the access terminal is not on the base station router, then the base station router may trigger (at 320) migration of the network access agent to a target base station router. For example, if the base station router operates according to MIP, a call processing context function in the base station router may verify, validate, and approve the idle mode entry request. Thus, the call processing context function at the current foreign agent may trigger a foreign agent router advertisement at the target foreign agent through network signaling, which may in turn trigger the access terminal to perform a MIP registration with the target foreign agent for a layer 3 anchor transfer of the network access agent to the target base station router.

The request to enter the idle mode may then be granted (at 315). In one embodiment, the network access agent transfer to the serving base station router happens just before the access terminal enters idle mode. Thus, the network access agent is relocated to the serving base station router (or the nearest node where the network access agent can be located) before the access terminal enters the idle mode, which may reduce the need to perform a network access agent transfer during idle mode or at the beginning of session re-establishment.

Figure 4:
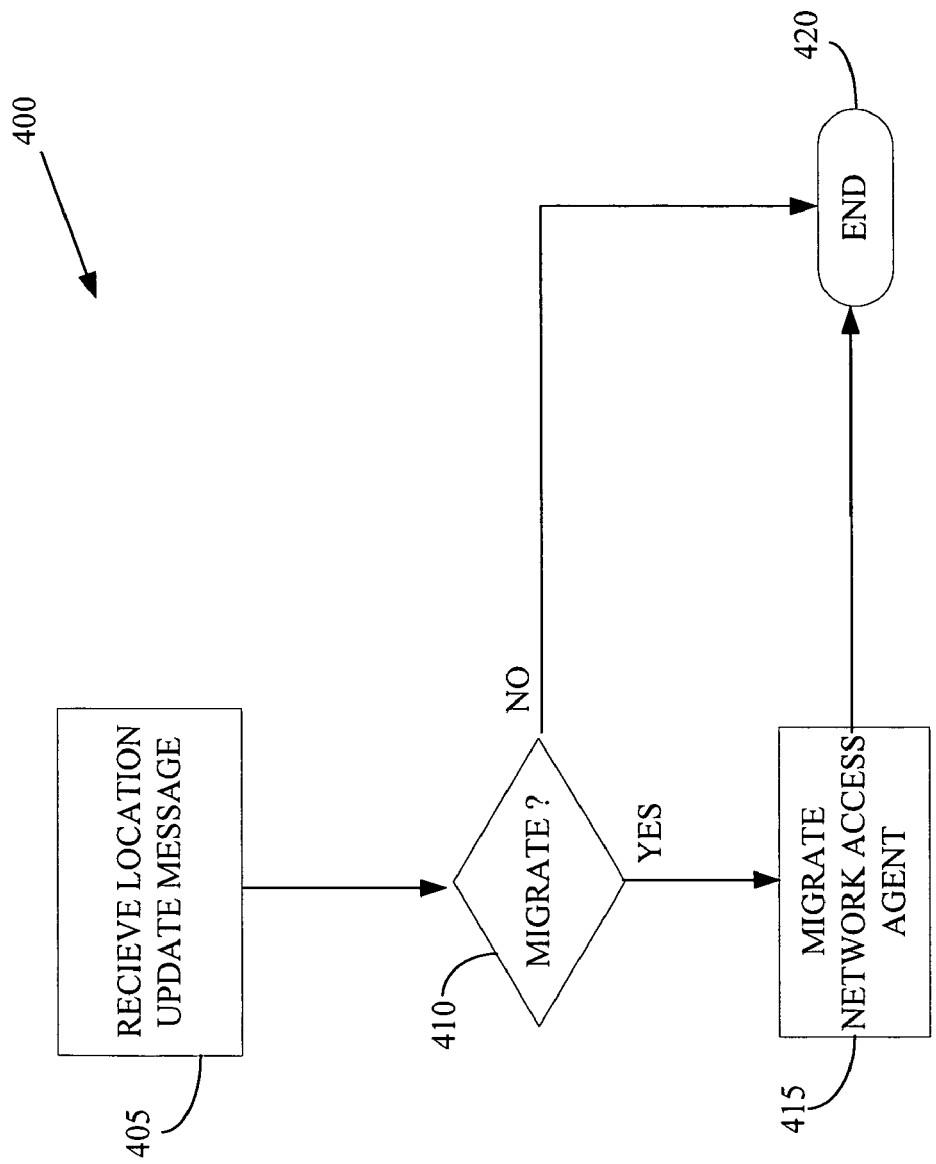
FIG. 4 conceptually illustrates one exemplary embodiment of a method for determining whether to migrate a network access agent in the idle mode, in accordance with the present invention.

FIG. 4 conceptually illustrates one exemplary embodiment of a method 400 for determining whether to migrate a network access agent associated with an access terminal in the idle mode. In the illustrated embodiment, a first base station router may receive (at 405) a location update message indicating that an access terminal has moved to a geographic area served by a second base station router. As used herein, the term "location update message" will be understood to refer to a message including information indicative of a location of an access terminal and/or movement of the access terminal. The idle access terminal may provide a location update message to the second base station router when it enters the geographic area served by the second base station router. In response to receiving the location update message, the second base station router may provide information indicative of the location of the access terminal and/or movement of the access terminal to the first (serving) base station router. In the illustrated embodiment, the first base station router includes the network access agent associated with the idle access terminal.

The first base station router may determine (at 410) whether or not to migrate the network access agent to the second base station router based on information associated with one or more applications on the access terminal. In the illustrated embodiment, the first base station router includes the network access agent that holds idle mode retain information including the call session context and can be made aware of the periodic location update information messages from the idle access terminal. Accordingly, the first base station router (or any other node that acts as the call anchor) can determine (at 410) whether or not to migrate the network access agent based on network topologies and/or MIP registration boundaries.

The first base station router (or any other node that acts as the call anchor) may also determine (at 410) whether or not to migrate the network access agent based on availability of tunnels between different base station routers in the path to the last reported base station router, the data path traversal time, one or more characteristics of the movement of the idle access terminal (e.g., is the idle access terminal moving relatively quickly or relatively slowly between base station router coverage areas), and predetermined movement patterns such as may be associated with highways, roads, train tracks, and the like. In each of these scenarios a specific FA migration algorithm and strategy could be formulated based on the information associated with one or more applications on the idle access terminal and/or one or more base station routers.

If the first base station router determines (at 410) that the network access agent associated with the idle access terminal should be migrated, then the network access agent may be migrated (at 415) to the second base station router. In one embodiment, the first base station router may act as a MIP client proxy (PMIP) for the access terminal. The first base station router may therefore handle MIP signaling on behalf of the idle access terminal. The network may initiate the network access agent migration (at 415) to the second base station router based on the location information associated with the idle access terminal (or any other information associated with the communication link) without specific signaling from the idle access terminal. Hence in a deployment scenario with PMIP, the network can migrate (at 415) the network access agent to the last reported base station router to reduce the eventual session re-establishment time when the idle access terminal moves from one base station router to another. The method 400 may end (at 420).

Figure 5:
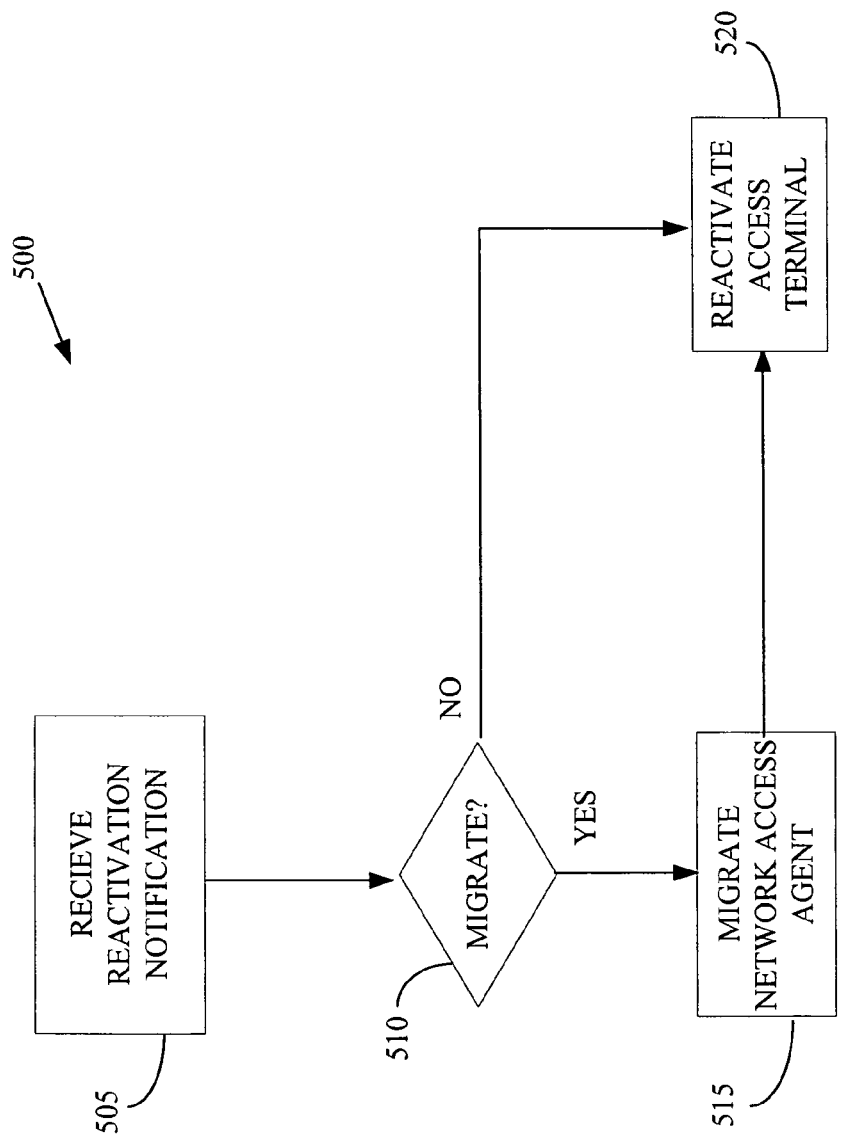
FIG. 5 conceptually illustrates one exemplary embodiment of a method for determining whether to migrate a network access agent while exiting the idle mode, in accordance with the present invention.

FIG. 5 conceptually illustrates one exemplary embodiment of a method 500 for determining whether to migrate a network access agent while an access terminal is exiting the idle mode. In the illustrated embodiment, a base station router may receive (at 505) a notification that in idle access terminal is going to be reactivated, e.g., in response to information to be transmitted by or received by the access terminal. For example, the access terminal may transmit a message indicating that the access terminal plans to resume transmissions and therefore should be reactivated. For another example, the network may provide a message indicating that the access terminal should be reactivated in response to receiving information destined for the access terminal.

The base station router may then determine (at 510) whether or not the network access agent should be migrated before the idle access terminal is reactivated. For example, the base station router may determine (at 510) that one or more applications associated with the access terminal's communication link are sensitive to re-activation latency. One example of an application that is sensitive to reactivation latency is the Push-to-Talk service. The base station router may determine (at 510) that the network access agent should be migrated when the idle access terminal leaves idle mode in CMIP or PMIP configuration so that the network access agent will be on the new serving base station router so that transport delay may be reduced. Since the access terminal will be reactivated whether or not the network access agent is migrated, there is no additional over-the-air (OTA) cost for the MIP signaling.

If the base station router determines (at 510) that the network access agent should be migrated, then the network access agent may be migrated (at 515). In one embodiment, a network access agent may be migrated (at 515) before the access terminal is reactivated (at 520). Alternatively, the network access agent may be migrated (at 515) concurrently with the reactivation process. If the base station router determines (at 510) that the network access agent should not be migrated, and the access terminal may be reactivated (at 520) without performing any migration.

Figure 6:
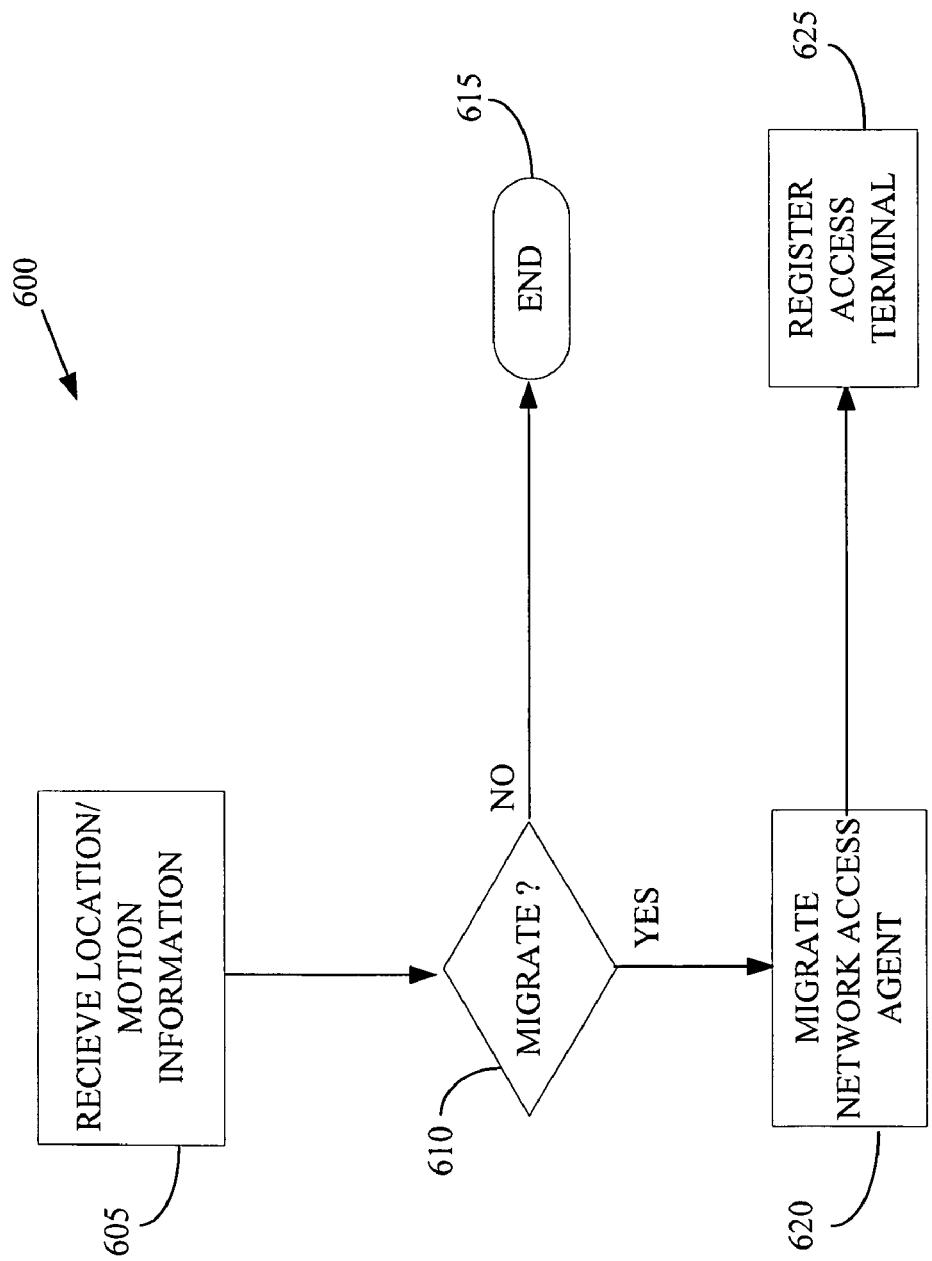
FIG. 6 conceptually illustrates one exemplary embodiment of a method for determining whether to migrate a network access agent associated with an active access terminal, in accordance with the present invention.

FIG. 6 conceptually illustrates one exemplary embodiment of a method 600 for determining whether to migrate a network access agent associated with an active access terminal. In the illustrated embodiment, a first base station router may receive (at 605) a information indicative of a location of an access terminal and/or movement of the access terminal. The information may indicate that the access terminal has moved to a geographic area served by a second base station router. For example, the access terminal may provide information indicative of location/motion of the access terminal to the second base station router when it enters the geographic area served by the second base station router. In response to receiving the location/motion information, the second base station router may provide information indicative of the location/motion of the access terminal to the first (serving) base station router. In the illustrated embodiment, the first base station router includes the network access agent associated with the access terminal.

The first base station router may determine (at 610) whether or not to migrate the network access agent to the second base station router based on information associated with one or more applications on the access terminal. In one embodiment, the first base station router may determine (at 610) whether or not to migrate the network access agent based whether or not a network access agent node is available in the second base station router or its neighborhood. The first base station router may also determine (at 610) whether or not to migrate the network access agent based on values of a network (tunneling) delay and/or on or more network load parameters. Various mobility characteristics of the access terminal, such as a speed of the access terminal, a rate of crossing BSR boundaries, movement along a pre-determined route such as along a highway, etc, may also be considered when determining (at 610) whether or not to migrate the network access agent. The QoS type of the service flows associated with the applications may also be considered. Exemplary QoS types may include types such as Unsolicited Grant Service (UGS), Real Time Variable Rate (RT-VR), Extended RT-VR (ERT-VR), Non RT-VR (NRT-VR) and Best Effort (BE), as defined in the Wimax standards. A Grade of Service (GOS) associated with user and/or the application, such as Gold, Silver, Bronze, may also be considered.

If it is determined (at 610) that the network access agent should not be migrated, and the method 600 may end (at 615). However, if it is determined (at 610) that the network access agent should be migrated, then the network access agent may be migrated (at 620). In one embodiment, migrating (at 620) the network access agent may include forwarding IP packets from the source base station router to the target base station router until the target base station router becomes the network access agent for the access terminal and a new HA-FA binding is formed. The HA-FA binding happens when the access terminal re-registers (at 625) with HA in response to receipt of an agent advertisement from the target base station router. In one embodiment, scheduling of re-registration (at 625) may be under the control of source and target base station router call control.

In various alternative embodiments, the migration (at 620) may be classified as reliable (e.g., the migration may occur without any packet loss but may be slower) or unreliable (e.g., the migration may occur with packet loss but may be faster). The classification could be based on QoS of the active flows associated with one or more applications. In the FA migration process, buffer sizes at the source and target base station router is and the time to synchronize the network access agent buffers in the source and/or target base station routers may be decided based on one or more of the guaranteed QoS flow parameters defined for the flow such as Maximum Sustained Traffic Rate (MSTR), Maximum Latency (ML), Tolerated Jitter (TJ), Request/Transmission Policy (R/TP), Minimum Reserved Traffic Rate (MRTR), Traffic Priority (TP), and the like.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method involving an access terminal that is served by a first base station router in a distributed wireless communication system, comprising:
   determining, prior to the access terminal being re-activated from an idle mode, whether to migrate a network access agent based on a reactivation latency associated with the access terminal and status information associated with the wireless communication system.

2. A method of claim 1, wherein determining whether to migrate the network access agent comprises determining whether to migrate the network access agent based on information indicative of at least one of a relay transport delay, control signaling overhead, a call reactivation time, a location of the access terminal, motion of the access terminal, a frequency or rate of mobility of physical layer mobility access, and a policy based timer.

3. The method of claim 1, wherein determining whether to migrate the network access agent comprises determining to migrate the network access agent to the first base station router in response to determining that the network access agent associated with the access terminal is not on the serving base station for the access terminal.

4. A method of claim 1, comprising receiving, at the first base station router, a request to enter the idle mode from the access terminal.

5. The method of claim 4, comprising determining whether the network access agent associated with the access terminal is on the first base station router in response to receiving the request to enter the idle mode.

6. The method of claim 5, comprising migrating the network access agent from a second base station router to the first base station in response to determining that the network access agent associated with the access terminal is not on the first base station.

7. The method of claim 6, comprising granting the request to enter the idle mode substantially after the network access agent has been migrated to the first base station.

8. The method of claim 1, wherein determining whether to migrate the network access agent comprises determining whether to migrate the network access agent while the access terminal is in the idle mode.

9. The method of claim 8, wherein determining whether to migrate the network access agent comprises determining whether to migrate the network access agent in response to information indicating at least one location of the access terminal.

10. The method of claim 9, wherein determining whether to migrate the network access agent comprises determining whether to migrate the network access agent based on at least one of a network topology, a registration boundary, a tunnel availability between a last-reported base station router and at least one base station router associated with said at least one location of the access terminal, a data path traversal time, at least one movement characteristic associated with the access terminal, and at least one predetermined movement pattern associated with the access terminal.

11. The method of claim 1, wherein determining whether to migrate the network access agent comprises determining whether to migrate the network access agent concurrently with activating the idle access terminal.

12. The method of claim 11, wherein determining whether to migrate the network access agent comprises determining whether to migrate the network access agent in response to information indicating reactivation of the idle access terminal.

13. The method of claim 1, wherein determining whether to migrate the network access agent comprises determining whether to migrate the network access agent based on at least one of an availability of a network access agent node, a network or tunneling delay, one or more network load parameters, a mobility characteristic of the access terminal, a quality of service type associated with the application, and a grade of service associated with the application.

14. The method of claim 13, comprising registering the access terminal with a home agent in response to determining to migrate the network access agent.

15. The method of claim 1, wherein determining whether to migrate the network access agent comprises determining whether to migrate the network access agent based on information associated with at least one of a Voice over Internet Protocol application, a video streaming application, an audio streaming application, and a Push-to-talk application.

16. The method of claim 1, wherein determining whether to migrate the network access agent comprises forcing migration of the network access agent based on the status information associated with the wireless communication system.

17. The method of claim 1, comprising migrating the network access agent.

* * * * *